(No Model.)

G. W. SNYDER.
THILL COUPLING.

No. 564,542. Patented July 21, 1896.

Witnesses
A. S. Diven
H. H. Mills

Inventor
George W. Snyder
by Eugene Diven
Attorney

UNITED STATES PATENT OFFICE.

GEORGE W. SNYDER, OF ELMIRA, NEW YORK, ASSIGNOR OF ONE-HALF TO ALBERT H. FOX, OF SAME PLACE.

THILL-COUPLING.

SPECIFICATION forming part of Letters Patent No. 564,542, dated July 21, 1896.

Application filed March 21, 1896. Serial No. 584,349. (No model.)

*To all whom it may concern:*

Be it known that I, GEORGE W. SNYDER, a citizen of the United States, residing at Elmira, in the county of Chemung and State of New York, have invented certain new and useful Improvements in Thill-Couplings, of which the following is a specification.

My invention relates to improvements in thill-couplings in which provision is made for preventing the rattle incident to such couplings; and the objects of my improvements are, first, to provide means for preventing rattle both in the eye of the thill-iron and in the coupling-bolt; second, to provide means for automatically taking up the wear in the eye of the thill-iron; third, to so construct the thill-irons that the thills may be quickly removed from the vehicle and a pole substituted without touching the bolts in the clips, and, fourth, to so construct my device that it may be attached to old vehicles without changing the clips that are already attached thereto. I attain these objects by the mechanism illustrated in the accompanying drawings, in which—

Figure 1:
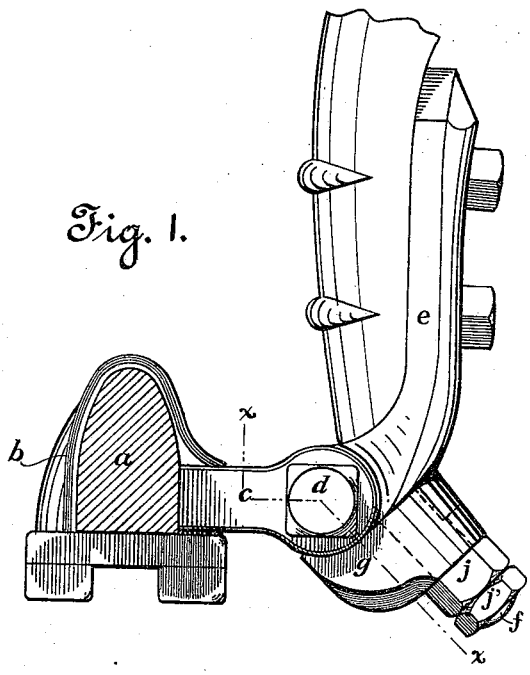
Figure 2:
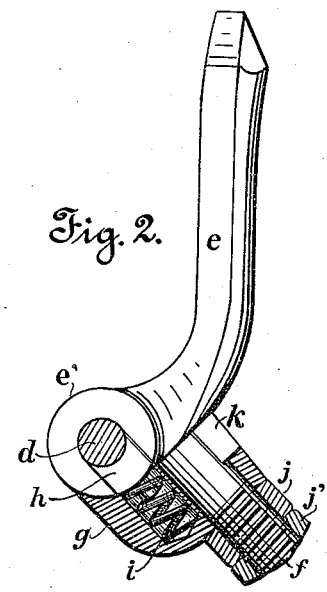
Figure 3:
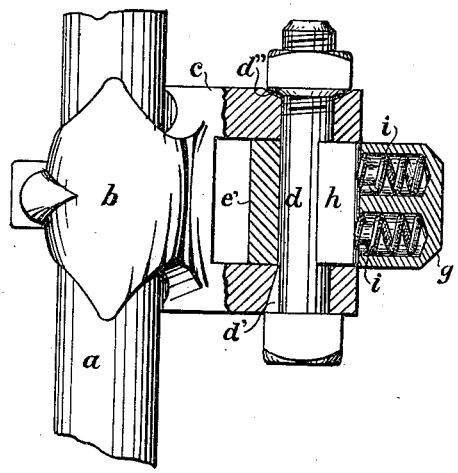
Figure 4:
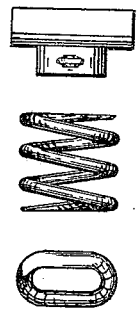

Figure 1 is a side elevation of a thill-coupling embodying my invention; Fig. 2, a side elevation of the thill-iron detached, the coupling-bolt and cap $g$ being shown in cross-section; Fig. 3, a top view of the thill-coupling, parts being shown in section on the line $x\ x$ in Fig. 1; Fig. 4, a modified form of the spring and adjustable bushing, and Fig. 5 a modification in the construction of the thill-iron connection.

Similar letters refer to similar parts throughout the several views.

$a$ represents the axle or wagon bar to which the thills are attached.

$b$ is the clip, secured to the axle in the ordinary manner and provided with the draw-arms $c\ c$, through eyes in which runs the coupling-bolt $d$. This bolt is rigidly fastened in the eyes, and I have illustrated my preferred way of accomplishing this. A snug $d'$ projects from the bolt at its head, tapering from the head inward, and when the bolt is driven in it fits tightly in a corresponding groove cut in an eye of the draw-arm on the side toward the clip, where the eye is strongest. The nut is coned at $d''$, the corresponding draw-arm's eye being countersunk to receive it. By this construction the bolt is driven in tight and held from turning, and, as the cone of the nut is screwed tightly into the countersink, the end of the bolt is held centrally and prevented from rattling. The bolt might be driven in and riveted permanently in place, but I prefer to make it detachable, as shown, in order that side wear in the draw-arms may be taken up, and also in order that thills having other couplings than mine may be attached to the clips, as occasion might require.

$e$ is the thill-iron, provided with the eye $e'$ to receive the bolt $d$. A slot is milled or otherwise cut across the eye opposite the point of greatest wear, the width of the slot being just sufficient to allow the coupling-bolt to slide into it. The bottom of the slot forms the bearing of the eye upon the bolt. In front of the slot a stud $f$ projects outward from the thill-iron, and upon this stud is held the cap $g$, which closes the outer end of the slot and holds within the slot the adjustable bushing $h$, springs $i\ i$ being located in suitable sockets in the cap in order to press the bushing against the coupling-bolt. The bushing is made, preferably, of composition metal. It is of the same width as the eye and fits closely in the slot, yet is free to move in it. Projections from the back of the bushing receive the ends of the coiled springs $i\ i$, these projections being provided with slight swellings over which the ends of the springs are sprung to hold them tightly to the bushing. It will be seen that the springs cause the bushing to bear evenly along the whole of the coupling-bolt exposed between the draw-arms.

Instead of two springs I might use one spring formed as in Fig. 4, the socket in the cap $g$ being then made oblong to receive it, and the bushing having but one projection of corresponding shape. Instead of coiled springs I might use a rubber spring. The particular nature of the spring is immaterial, so far as it concerns the nature of my invention.

The coupling is put together as follows:

After the coupling-bolt has been driven into place and fastened, the slot in the thill-iron eye is slipped down upon the bolt, the stud $f$ acting as a guide, since the rear of the stud is flush with the front wall of the slot. The bushing is placed with its springs in the sockets in cap $g$, and the cap is slipped up on the stud, the bushing entering the slot and being pressed against the coupling-bolt by the compression of the springs when the cap is drawn up tight against the eye by the nut $j$. The jam-nut $j'$ may be provided to prevent the nut from jarring loose. The compression of the springs is such as to clamp the bottom of the slot and the bushing snugly against the bolt, thus preventing any rattle or squeak in the parts and yet leaving the thill-iron free to turn upon the bolt. A key $k$ is located at the front of the stud at its base, and a corresponding slot is cut in the cap, so that the cap shall be guided to place and the alinement of the bushing with the slot shall be insured. The key also acts as a brace and strengthening-piece for the stud. The cap, when in place, covers the slot completely and prevents dirt or dust from working into the joints between the bushing and the sides of the slot.

Figure 5:
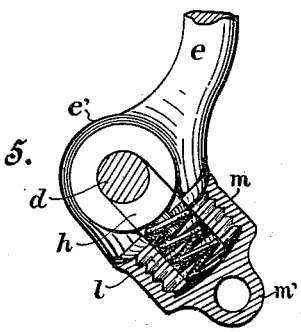

In the modification shown in Fig. 5 a boss $l$ projects from the eye of the thill-iron and is screw-threaded on the outside to receive the cap $m$. The slot in this case is cut across the center of the boss. The bushing and spring slide up in the slot, and the cap when screwed on holds them in place, with the spring in proper compression. The outer diameter of the cap is the same as the length of the slot, and it is screwed tightly against the concave shoulder at the base of the boss, so that in this construction also the slot-opening is covered and dirt prevented from entering. The cap is hexagonal on the outside and is also provided with an eye $m'$, so that it may be adjusted by a wrench or small bar, whichever happens to be at hand.

By my construction I produce a coupling that will not rattle or squeak, and at the same time I combine with this feature provision for quickly changing the thills. All that is necessary in making a change is to remove the cap on each side, and with it the bushing and spring, after which the thills may be lifted out and the pole that is to take their place quickly slipped into place and coupled on.

Another feature of importance is my provision against wear in the parts. As the bolt is held in tightly and cannot turn, there will be no wear or rattle where it passes through the eyes in the draw-arms. The bushing extends along the bolt throughout its length between the draw-arms and presses against it evenly on every portion thereof, the bottom of the slot being drawn against the bolt in like manner. The wear on the eye is at the bottom of the slot directly opposite the bushing, and it is taken up as fast as it appears by the bushing, which is pressed in to take up such wear by the spring, thus acting automatically to keep the joint tight.

As my joint is tight at all times, wear will be reduced to a minimum, since the great cause of this wear is the looseness of the parts, which allows the thill to jump or bound up and down due to the vibration of the running-gear of the vehicle, the parts thus constantly striking against each other and producing rapid wear.

The only wear in my coupling is due to the turning of the thill-iron eye on the bolt and not to vibrations. Should this wear in time become considerable, it may be easily repaired by slipping a piece of leather of suitable shape between the bolt and bottom of slot, which will take up the wear and last longer than an ordinary metal bushing put in the same place.

When it is desired to place my thill-coupling on an old vehicle, it is only necessary to fasten a coupling-bolt tightly into the eyes in the draw-arms of the clip already attached to the vehicle, which can be done as I have shown it, without removing or changing the clips by simply grooving one eye to receive the snug on the bolt and countersinking the other eye. This does not necessitate breaking the paint on the vehicle.

I am aware that thill-couplings have been made in which a boss projecting from the thill-iron is centrally bored to receive a flexible pad or plunger which bears at one end against a small portion of the coupling-bolt; also that metal bushings or friction-plates have been set up against the eye of the thill-iron by coiled springs suitably adjusted, and I therefore do not claim any of these things broadly.

What I do claim as my invention, and desire to secure by Letters Patent, is—

1. In a thill-coupling a thill-iron provided with a longitudinal slot in its eye to fit the coupling-bolt, said slot being cut opposite the point of greatest wear and opening downward in order that the thill-iron may be slipped down upon the bolt, a bushing slidable in the slot and of the same length as the eye, a cap adapted to completely cover the slot-opening when in place, and a spring in a recess in the cap and pressing the bushing against the bolt whereby the bushing is rendered automatically adjustable, all combined substantially as shown and for the purposes set forth.

2. In a thill-coupling, in combination, a thill-iron provided with a longitudinal slot in its eye, a stud projecting from the thill-iron at one side of the slot, a cap adapted to be fastened upon the stud and covering the slot-opening, a spring in a socket in the cap, and a bushing within the slot and pressed by the springs in the cap against the coupling-bolt when the cap is secured in place.

3. In a thill-coupling, in combination, a thill-iron provided with a longitudinal slot in its eye, a stud projecting from the thill-iron at one side of the slot, a key at the base of the stud, a cap adapted to be secured to the stud and provided with a slot to receive the key, a spring in a socket in the cap opposite the slot-opening in the eye, and a bushing within the slot and pressed by the spring against the coupling-bolt when the cap is secured in place.

In testimony whereof I have affixed my signature in presence of two witnesses.

GEORGE W. SNYDER.

Witnesses:
A. S. DIVEN, 2d,
H. H. MILLS.